United States Patent
Lin et al.

(10) Patent No.: US 8,422,865 B2
(45) Date of Patent: Apr. 16, 2013

(54) DVD NAVIGATION SYSTEMS AND COMPUTER-IMPLEMENTED METHODS WITH CHECK FUNCTIONS

(75) Inventors: Hsun-Yu Lin, Taipei (TW); I-Hung Ko, Taipei (TW)

(73) Assignee: VIA Technologies, Inc., Hsin-Tien, Taipei (TW)

( * ) Notice: Subject to any disclaimer, the term of this patent is extended or adjusted under 35 U.S.C. 154(b) by 1437 days.

(21) Appl. No.: 11/539,253

(22) Filed: Oct. 6, 2006

(65) Prior Publication Data

US 2008/0085101 A1  Apr. 10, 2008

(51) Int. Cl.
*H04N 9/88* (2006.01)
*H04N 9/80* (2006.01)

(52) U.S. Cl.
USPC .......................................... 386/263; 386/248

(58) Field of Classification Search ........................ None
See application file for complete search history.

(56) References Cited

U.S. PATENT DOCUMENTS

| | | | |
|---|---|---|---|
| 6,356,914 B1 * | 3/2002 | deCarmo et al. ........................ 1/1 |
| 7,197,236 B2 * | 3/2007 | Nakatani et al. .............. 386/264 |
| 7,440,681 B2 * | 10/2008 | Winter ........................... 386/248 |
| 2006/0095761 A1 * | 5/2006 | Davis ............................ 713/165 |
| 2006/0153537 A1 * | 7/2006 | Kaneko et al. ................... 386/95 |

FOREIGN PATENT DOCUMENTS

CN    1750155    3/2006

OTHER PUBLICATIONS

English abstract of CN1750155.

* cited by examiner

*Primary Examiner* — William C Vaughn, Jr.
*Assistant Examiner* — Gelek W Topgyal
(74) *Attorney, Agent, or Firm* — McClure, Qualey & Rodack, LLP

(57) ABSTRACT

A DVD navigation system comprises a plurality of navigation modules and a utility. Each navigation module comprises a check function determining data correctness of tables corresponding to the respective navigation modules. Each navigation module generates a read table request. The utility receives the read table request, reads at least one table identified by the read table request from at least one IFO file in a file system, and checks data correctness of the table by using the check function. If the data of the table is incorrect, the utility reads the table from at least one backup file of the IFO file in the file system, and transmits the data to the navigation module for decoding.

4 Claims, 10 Drawing Sheets

DVD NAVIGATION SYSTEMS AND COMPUTER-IMPLEMENTED METHODS WITH CHECK FUNCTIONS

BACKGROUND OF THE INVENTION

1. Field of the Invention

The disclosure relates generally to disc navigation and, more particularly to DVD navigation systems and methods by a check function for using IFO (DVD information) files or BUP (backup) files.

2. Description of the Related Art

Digital Versatile Discs (DVDs) are high capacity CD-size disc for video, multimedia, game and audio applications. Due to high quality requirements of video and audio, DVD has gradually become the most popular format for playback of prerecorded video.

In DVD specification, IFO, BUP and VOB (Video Object) files are utilized. IFO files include a plurality of tables for recording related navigation information such as chapters, subtitle tracks and audio tracks. BUP files are backup files of the IFO files. VOB files contain video, audio, subtitle, and menu content. FIG. 1 is a schematic diagram of DVD-Video navigation. In front-end 110, a file system 112 reads and stores data from a disc 116, such as DVD, via a loader 114. The data includes the IFO, BUP and VOB files. Tables in these files include Video Manager (VMG), Video Title Set (VTS), VMENU (Video Menu), VPGC (Video Program Chain), VPG (Video Program), VCELL (Video Cell), and VOBU tables. These tables are layered. For example, VTS is on VMG, VPGC is on VTS, VPG is on VPGG, and the like.

Several modules including VMG module 122, VTS module 123, VMENU module 124, VPGC module 125, VPG module 126, VCELL module 127, and VOBU module 128 are required for DVD-Video navigation. The modules can handle their respective tables. The VMG module 122 reads the corresponding table from the file system 112 via a utility 121, and decodes the corresponding table to obtain and output related information to the VTS module 123 or the VMENU module 124. VMG is the table for all contents for all VTSs. VMG is composed of control data referred to as VMGI, VOS of VMG menu, and backup of the control data. The control data is static information for playing back titles and providing information to support user operations. VOS is a collection of VOBs used for menus that support the volume access.

The VMENU module 124 receives information from the VMG module 122, reads corresponding tables from the file system 112 via the utility 121 accordingly, and decodes the corresponding tables to obtain and output related information to the VTS module 123. VMENU module 124 is defined as the display image which includes selection items (Buttons).

The VTS module 123 receives information from the VMG module 122 and VMENU module 124, and reads corresponding tables from the file system 112 via the utility 121 accordingly, and decodes the corresponding tables to obtain and output related information to the VPGC module 125. VTS is a collection of titles. Each VTS is composed of control data referred to as Video Title Set Information (VTSI), VOS for the VTS menu, VOS for titles in a VTS, and backup control data.

The VPGC module 125 receives information from the VTS module 123, and reads corresponding tables from the file system 112 via the utility 121 accordingly, and decodes the corresponding tables to obtain and output related information to the VPG module 126. VPGC is composed of playback information referred to as Program Chain Information (PGCI) and the cells in VOBs needed for the playback of Program Chain (PGC).

The VPG module 126 receives information from the VPGC module 125, and reads corresponding tables from the file system 112 via the utility 121 accordingly, and decodes the corresponding tables to obtain and output related information to the VCELL module 127. VPG is a group of cells defined in a PGCI. Programs are used to divide a PGC into pieces. Different modes are defined. If the PGC is in Random/Shuffle mode, one of the programs is selected randomly. If the number of programs in a PGC is zero, the PGC is a dummy PGC.

The VCELL module 127 receives information from the VPG module 126, and reads corresponding tables from the file system 112 via the utility 121 accordingly, and decodes the corresponding tables to obtain and output related information to the VOBU module 128. A VCELL is a unit formed by compiling appropriate sections in a VOB and provides a structure for directing presentation of a part of or the whole VOB.

The VOBU module 128 receives information from the VCELL module 127, finds the address and length of VOBUs needed for playback, and directs the back-end 130 to play back. VOBU is a part of a cell with the presentation time period. VOBU includes video data, audio data, sub-picture data, PCI data and the Data Search Information (DSI) data.

FIG. 2 is a schematic diagram of DVD-Audio navigation. In addition to the modules of DVD-Video navigation, ATS module 141, APGC module 142, ASV module 143, and APG module 144 in DVD-Audio navigation are further required. In DVD-Audio navigation, AMG module 140 may be instead of VMG module 122 of DVD-Video navigation.

The AMG module 140 reads the corresponding tables from the file system 112 via the utility 121, and decodes the corresponding tables to obtain and output related information to the VTS module 123, the VMENU 124, and the ATS module 141. AMG is the table for all contents in DVD-Audio zone and DVD-Video zone (if present) for audio player. AMG is composed of Audio Manager Information (AMGI), VOS for AMG menu, and a backup of AMGI.

The ATS module 141 receives information from the AMG module 140 and the VMENU module 124, reads corresponding tables from the file system 112 via the utility 121 accordingly, and decodes the corresponding tables to obtain and output related information to the APGC module 142. ATS is a logical unit defined by the Audio Only Titles (AOTT) for audio player. Two types of ATSs are provided. One is composed of Audio Title Set Information (ATSI), Audio Object Set for AOTT, and a backup of ATSI. Another is composed of ATSI and a backup of ATSI. In this case, an Audio stream in VOBs, recorded for Audio with Video Title (AVTT) is referred as the object of AOTT.

The APGC module 142 receives information from the ATS module 141, reads corresponding tables from the file system 112 via the utility 121 accordingly, and decodes the corresponding tables to obtain and output related information to the ASV module 143 and APG module 144. APGC is a logical unit for presenting a part of or the entire of contents. It is composed of PGCI on which the order and the essence of the presentation are described, and zero or more cells to be presented.

The ASV module 143 receives information from the APGC module 142, reads corresponding tables from the file system 112 via the utility 121 accordingly, and decodes the corresponding tables to obtain related information. ASV is the logical unit defining the collection of ASV to be presented together with audio data by video capable audio player. ASV is composed of Audio Still Video Set Information (ASVSI), Audio Still Video Object Set (ASVOBS) and a backup of ASVSI.

Similarly, the APG module 144 receives information from the APGC module 142, reads corresponding tables from the file system 112 via the utility 121 accordingly, and decodes the corresponding tables to obtain related information. APG is a logical unit for dividing the contents in an APGC. APGC may be divided into integer number of APGs. The APG shall be composed of integer number of cells.

The information generated by the VOBU module 128, ASV module 143, and APG module 144 can be used to request the back-end 130 to play back.

As described, the BUP files are backup files of the IFO files. The backup files can be used to replace the IFO files if the IFO files are lost or damaged. However, no solution for DVD navigation with using BUP files when IFO files are lost or damaged is currently used.

BRIEF SUMMARY OF THE INVENTION

An embodiment of a DVD navigation system includes a plurality of navigation modules and a utility. Each navigation module generates a read table request. The utility reads a table identified by the read table request from an IFO file in a file system, and checks data correctness of the table. If the data of the table is incorrect, the utility reads the table from a backup file of the IFO file in the file system, and transmits the data to the navigation module for decoding.

In an embodiment of a DVD navigation method, a read table request is generated by a navigation module. A table identified by the read table request is read from an IFO file in a file system, and data correctness of the table is checked. If the data of the table is incorrect, the table is read from a backup file of the IFO file in the file system, and the data is transmitted to the navigation module for decoding.

An embodiment of a DVD navigation system includes a plurality of navigation modules and a utility. Each navigation module includes a check function determining data correctness of the tables corresponding to the respective navigation modules. Each navigation module generates a read table request. The utility receives the read table request, reads at least one table identified by the read table request from an IFO file in a file system, and checks data correctness of the table by using the check function. If the data of the table is incorrect, the utility reads the table from a backup file of the IFO file in the file system, and transmits the data to the navigation module for decoding.

In an embodiment of a DVD navigation method, a read table request is generated by a navigation module. The navigation module includes a check function determining data correctness of the tables corresponding to the navigation module. A table identified by the read table request is read from an IFO file in a file system, and data correctness of the table is checked by using the check function. If the data of the table is incorrect, the table is read from at least one backup file of the IFO file in the file system, and the data is transmitted to the navigation module for decoding DVD navigation systems and methods may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Figure 1:
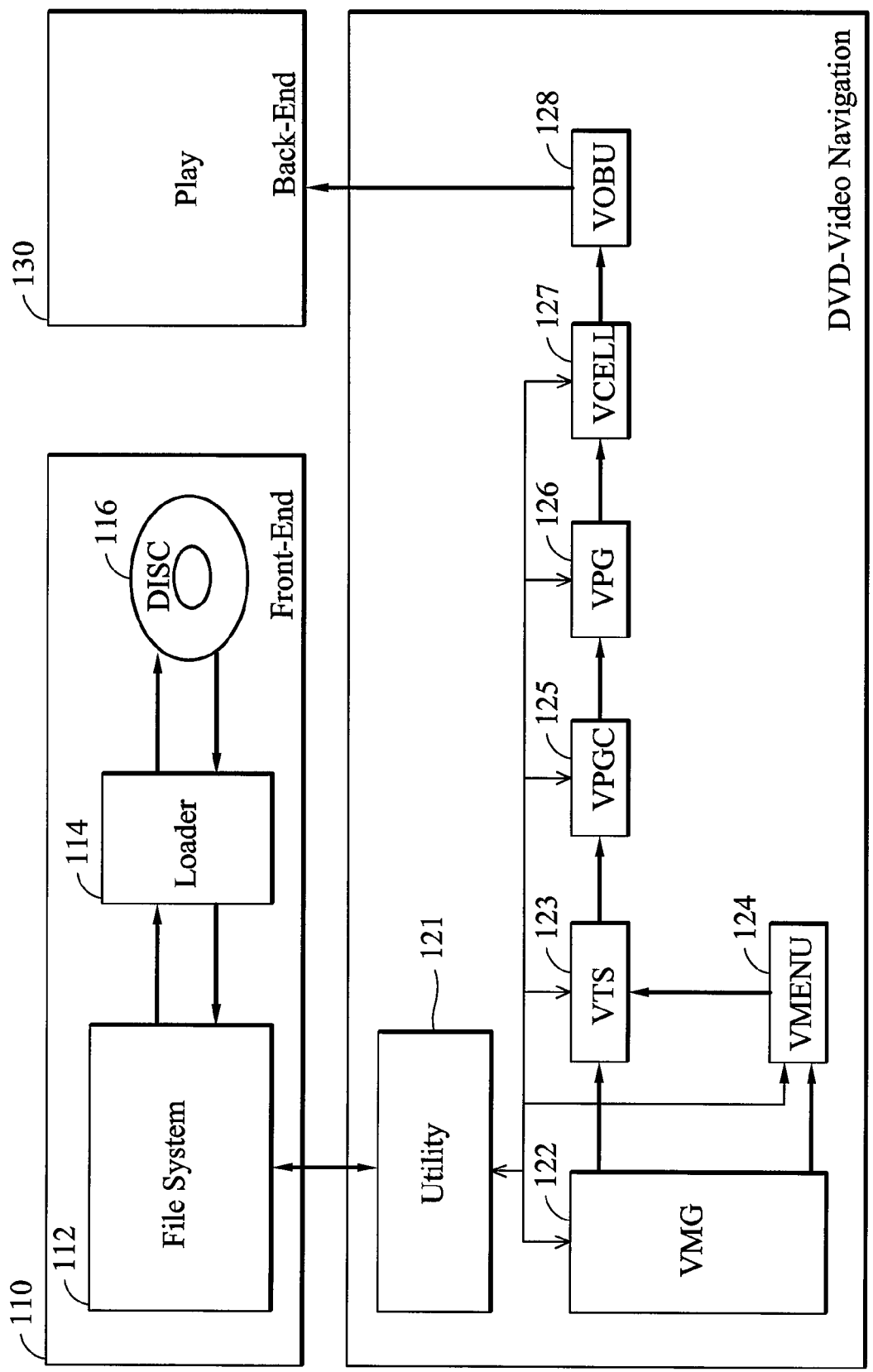
FIG. 1 is a schematic diagram of DVD-Video navigation.
Figure 2:
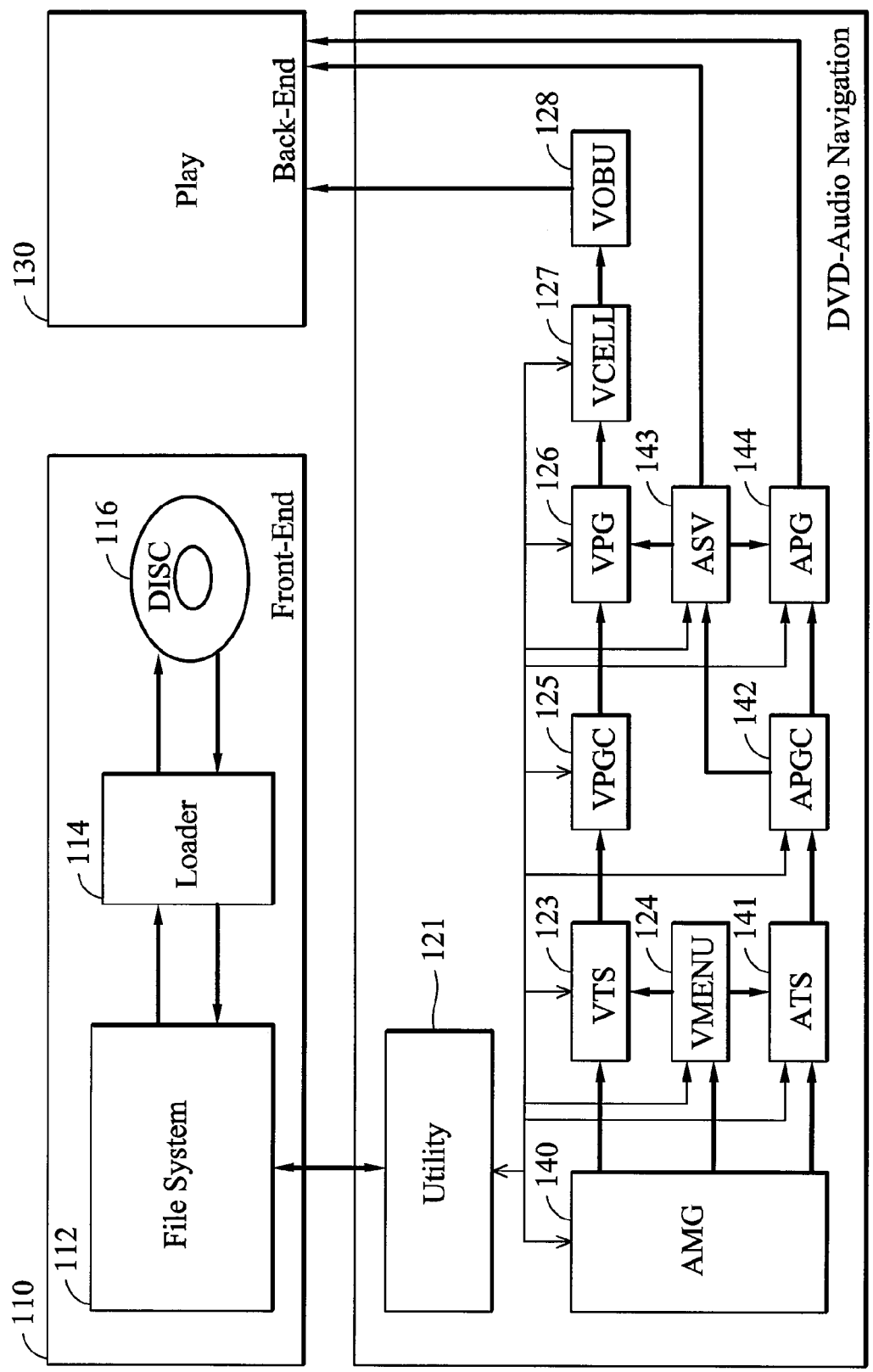
FIG. 2 is a schematic diagram of DVD-Audio navigation.
Figure 3:
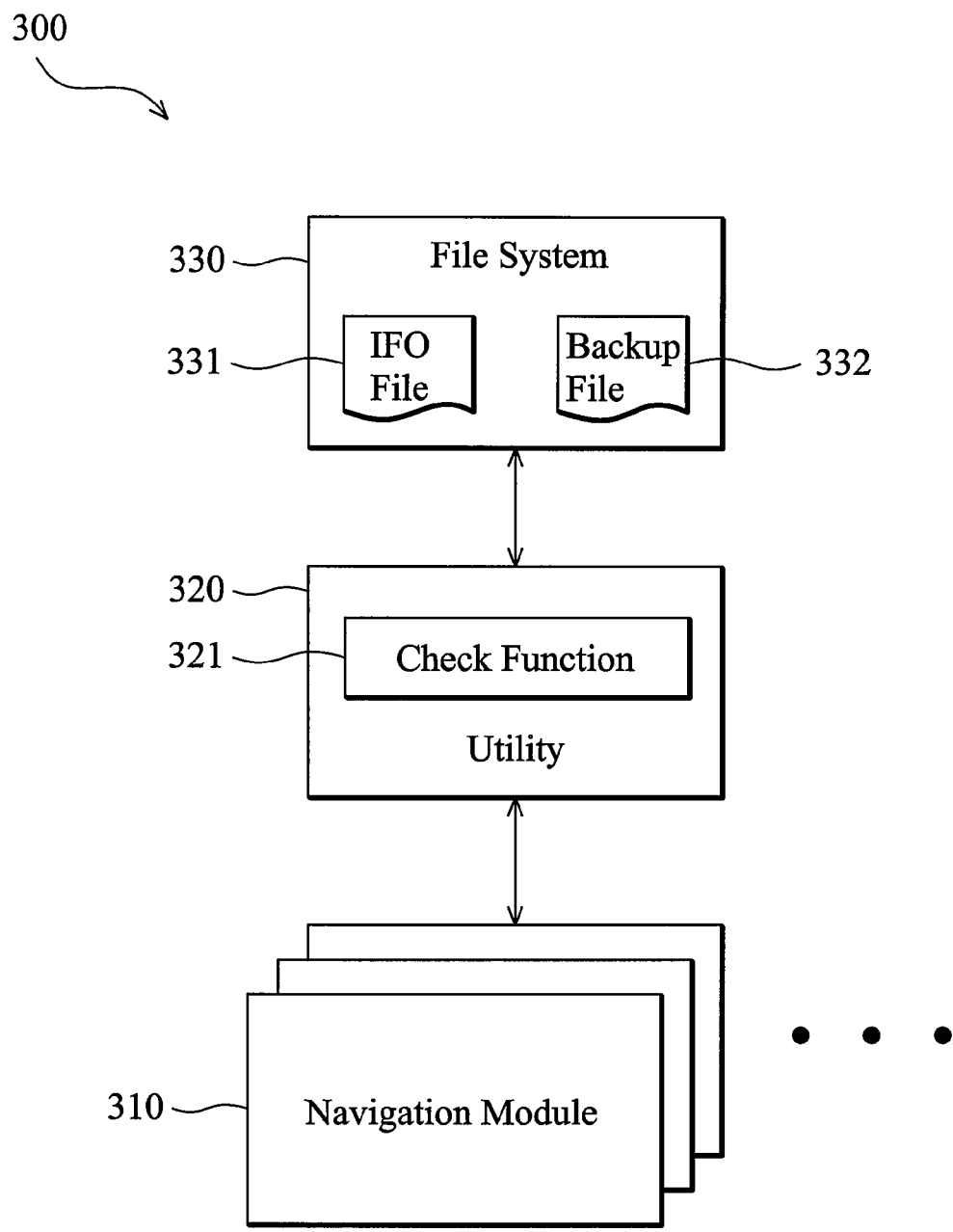
FIG. 3 is a schematic diagram illustrating an embodiment of a DVD navigation system.

FIG. 3 is a schematic diagram illustrating an embodiment of a DVD navigation system.

The DVD navigation system 300 includes a plurality of navigation modules 310, a utility 320, and a file system 330. Each navigation module 310 generates and transmits a read table request to the utility 320. It is understood that the read table request indicates at least one table required for the navigation module 310 transmitting the read table request. The utility 320 receives the read table request, and reads related tables from the file system 330. The utility 320 includes a check function 321 determining whether data of the tables is correct. The file system 330 includes at least one IFO file 331, and at least one backup file 332 of the IFO file 331. The IFO file 331 may be composed of tables, including VMG, VTS, VMENU, VPGC, VPG, VCELL, AMG, ATS, APGC, APG, and ASV tables. At first, the utility 320 reads the tables from the IFO file 331 in the file system 330. The utility 320 checks data correctness of the tables by using the check function 321. If the data is correct, the utility 320 directly transmits the data to the navigation module 310 according to the read table request. If the data is incorrect, the utility 320 reads tables from the backup file 332 in the file system 330, and transmits the data of the table to the navigation module 310 according to the read table request.

The check function 321 may determine whether a start address of the table in a specific table containing the table exceeds zero, and is less than an end address of the specific table. For example, whether the start address of VTS in VMG exceeds zero, and is less than the end address of VMG. It is to determine whether the start address of VPGC in VTS exceeds zero and is less than the end address of VTS. It is to determine whether the start address of VPG in VPGC exceeds zero, and is less than the end address of VPGC. The rules for other tables are similar thereto. Further, the check function 321 may determine whether an end address of the table in a specific table containing the table exceeds a start address of the table, and is less than an end address of the specific table. For example, it is to determine whether the end address of VTS in VMG exceeds the start address of VTS, and is less than the end address of VMG. It is to determine whether the end address of VPGC in VTS exceeds the start address of VPGC, and is less than the end address of VTS. It is to determine whether the end address of VPG in VPGC exceeds the start address of VPG, and is less than the end address of VPGC. The rules for other tables are similar thereto.

Each table may record a quantity of each of its sub-tables. The check function 321 may determine whether the quantity of the table is less than a boundary corresponding to a specific table containing the table. For example, titles are recorded in VMG, and PGCs are recorded in VMG, VTS, and VMENU. Some tables index the quantity and size of their sub-tables. The check function 321 may determine whether the sub-table size matches its total size. Additionally, the check function 321 may determine whether the quantity of the table equals the total size of the table divided by the table size, in which the total size of the table is recorded in a specific table containing the table. For example, total size of VPGC is indexed from VTS by the difference of the end address and start address. Since each VPGC table must equal 4 bytes, the quantity of VTS tables must equal total size of VPGC divided by 4. Furthermore, specific data checks for specific tables are provided whether an ID "DVDVIDEO-VMG" is in VMG table, whether an ID "DVDVIDEO-VTS" is in VTS table, or whether a version number is in VMG or VTS table.

Figure 4:
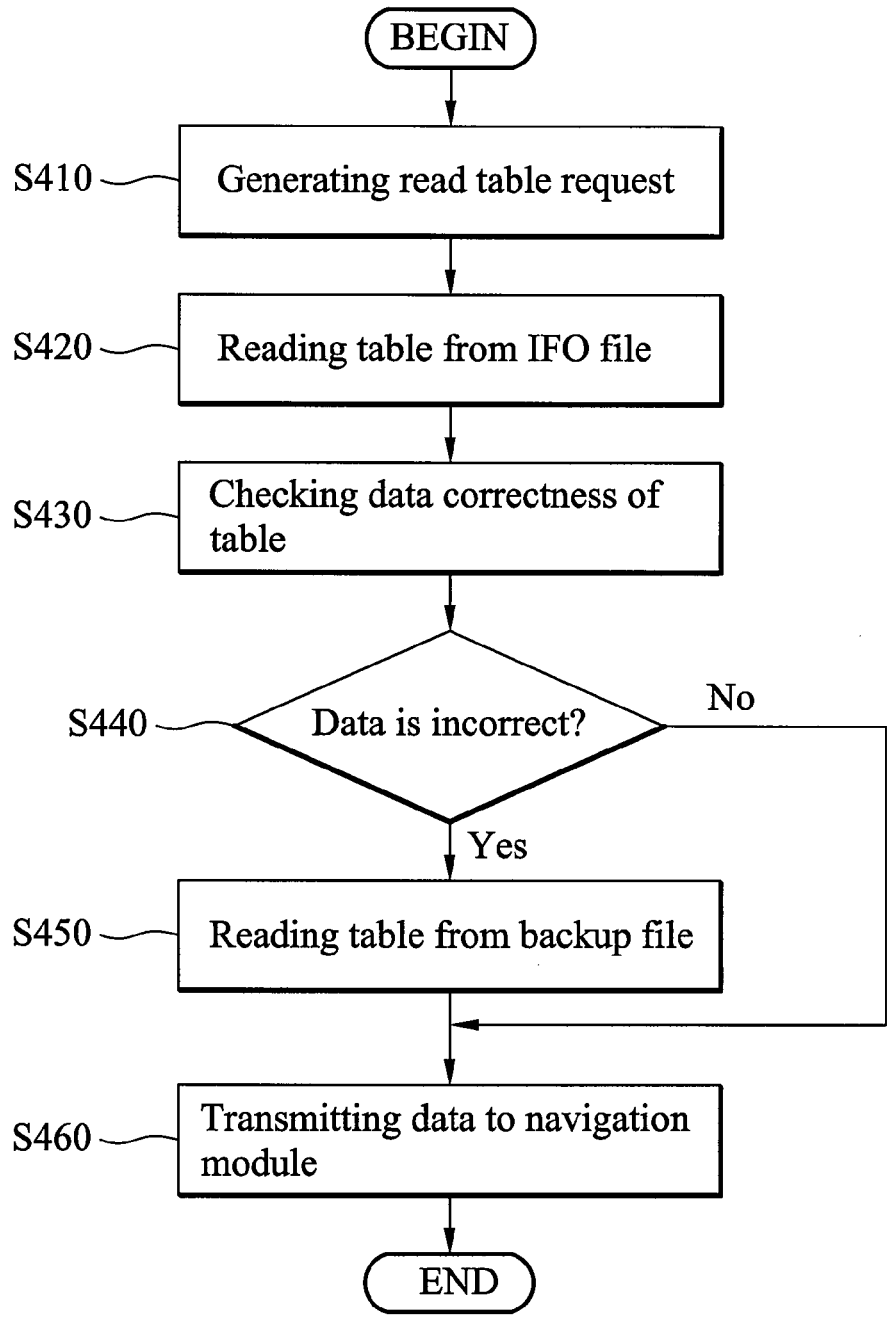
FIG. 4 is a flowchart showing an embodiment of a DVD navigation method.

FIG. 4 is a flowchart showing an embodiment of a DVD navigation method. In step S410, a read table request is generated by a navigation module 310. As described, the navigation module 310 may be one of the modules used in DVD navigation, including VMG, VTS, VMENU, VPGC, VPG, VCELL, AMG, ATS, APGC, APG, and ASV modules. In step S420, at least one table indicated by the read table request is read from at least one IFO file 331 in the file system 330. In step S430, the data correctness of the tables is checked. In step S440, if the data is correct, proceeding in step S460, the data of the tables is directly transmitted to the navigation module 310 according to the read table request. If the data is incorrect, proceeding in step S450, the table indicated by the read table request is read from at least one backup file 332 in the file system 330, and then proceeding in step S460, the data of the table is transmitted to the navigation module 310 requesting the table according to the read table request.

Figure 5:
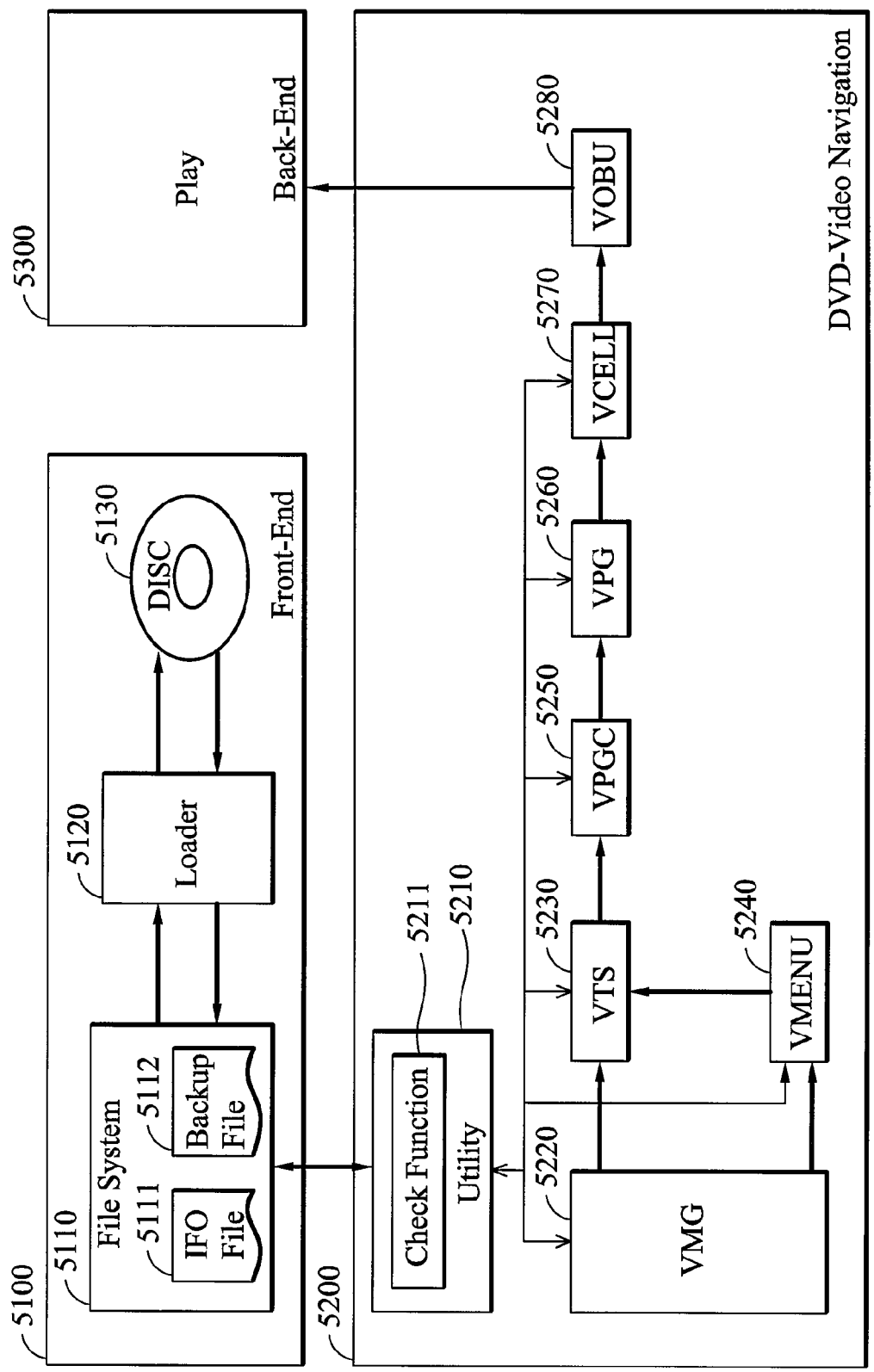
FIG. 5 is a schematic diagram illustrating an embodiment of DVD-Video navigation.

FIG. 5 is a schematic diagram illustrating an embodiment of DVD-Video navigation.

In front-end 5100, a file system 5110 reads and stores data from a disc 5130, such as DVD via a loader 5120, and stores the data therein. The data includes IFO files 5111, backup files 5112 of the IFO files 5111 and VOB files (not shown). Tables in these files include VMG, VTS, VMENU, VPGC, VPG, VCELL, and VOBU tables.

In DVD-Video navigation, VMG module 5220, VTS module 5230, VMENU module 5240, VPGC module 5250, VPG module 5260, VCELL module 5270, and VOBU module 5280 are provided. Respective modules read different tables via a utility 5210 including a check function 5211. The VMG module 5220 transmits a read table request indicating VMG tables to the utility 5210. The utility 5210 reads the VMG tables from the IFO files 5111 in the file system 5110, and checks the data correctness of the VMG tables using the check function 5211. If the data is correct, the VMG tables are transmitted to the VMG module 5220 for decoding. If the data is incorrect, the utility 5210 reads the VMG tables from the backup files 5112 in the file system 5110, and the VMG tables are transmitted to the VMG module 5220 for decoding. The VMG module 5220 decodes the VMG tables to obtain and output related information to the VTS module 5230 or the VMENU module 5240.

The VMENU module 5240 receives information from the VMG module 5220, and transmits a read table request indicating VMENU tables to the utility 5210 accordingly. The utility 5210 reads the VMENU tables from the IFO files 5111 in the file system 5110, and checks the data correctness of the VMENU tables by using the check function 5211. If the data is correct, the VMENU tables are transmitted to the VMENU module 5240 for decoding. If the data is incorrect, the utility 5210 reads the VMENU tables from the backup files 5112 corresponding to the IFO files 5111 in the file system 5110, and the VMENU tables are transmitted to the VMENU module 5240 for decoding. The VMENU module 5240 decodes the VMENU tables to obtain and output related information to the VTS module 5230.

The VTS module 5230 receives information from the VMG module 5220 and the VMENU module 5240, and transmits a read table request indicating VTS tables to the utility 5210 accordingly. The utility 5210 reads the VTS tables from the IFO files 5111 in the file system 5110, and checks the data correctness of the VTS tables by using the check function 5211. If the data is correct, the VTS tables are transmitted to the VTS module 5230 for decoding. If the data is incorrect, the utility 5210 reads the VTS tables from the backup files 5112 of the IFO files 5111 in the file system 5110, and the VTS tables are transmitted to the VTS module 5230 for decoding. The VTS module 5230 decodes the VTS tables to obtain and output related information to the VPGC module 5250.

The VPGC module 5250 receives information from the VTS module 5230, and transmits a read table request indicating VPGC tables to the utility 5210 accordingly. The utility 5210 reads the VPGC tables from the IFO files 5111 in the file system 5110, and checks the data correctness of the VPGC tables by using the check function 5211. If the data is correct, the VPGC tables are transmitted to the VPGC module 5250 for decoding. If the data is incorrect, the utility 5210 reads the VPGC tables from the backup files 5112 of the IFO files 5111 in the file system 5110, and the VPGC tables are transmitted to the VPGC module 5250 for decoding. The VPGC module 5250 decodes the VPGC tables to obtain and output related information to the VPG module 5260.

The VPG module 5260 receives information from the VPGC module 5250, and transmits a read table request indicating VPG tables to the utility 5210 accordingly. The utility 5210 reads the VPG tables from the IFO files 5111 in the file system 5110, and checks the data correctness of the VPG tables by using the check function 5211. If the data is correct, the VPG tables are transmitted to the VPG module 5260 for decoding. If the data is incorrect, the utility 5210 reads the VPG tables from the backup files 5112 of the IFO files 5111 in the file system 5110, and the VPG tables are transmitted to the VPG module 5260 for decoding. The VPG module 5260 decodes the VPG tables to obtain and output related information to the VCELL module 5270.

The VCELL module 5270 receives information from the VPG module 5260, and transmits a read table request indicating VCELL tables to the utility 5210 accordingly. The utility 5210 reads the VCELL tables from the IFO files 5111 in the file system 5110, and checks the data correctness of the VCELL tables by using the check function 5211. If the data is correct, the VCELL tables are transmitted to the VCELL module 5270 for decoding. If the data is incorrect, the utility 5210 reads the VCELL tables from the backup files 5112 of the IFO files 5111 in the file system 5110, and the VCELL tables are transmitted to the VCELL module 5270 for decoding. The VCELL module 5270 decodes the VCELL tables to obtain and output related information to the VOBU module 5280. The VOBU module 5280 receives information from the VCELL module 5270, finds the address and length of VOBUs needed for playback, and requests the back-end 5300 to play back.

Figure 6:
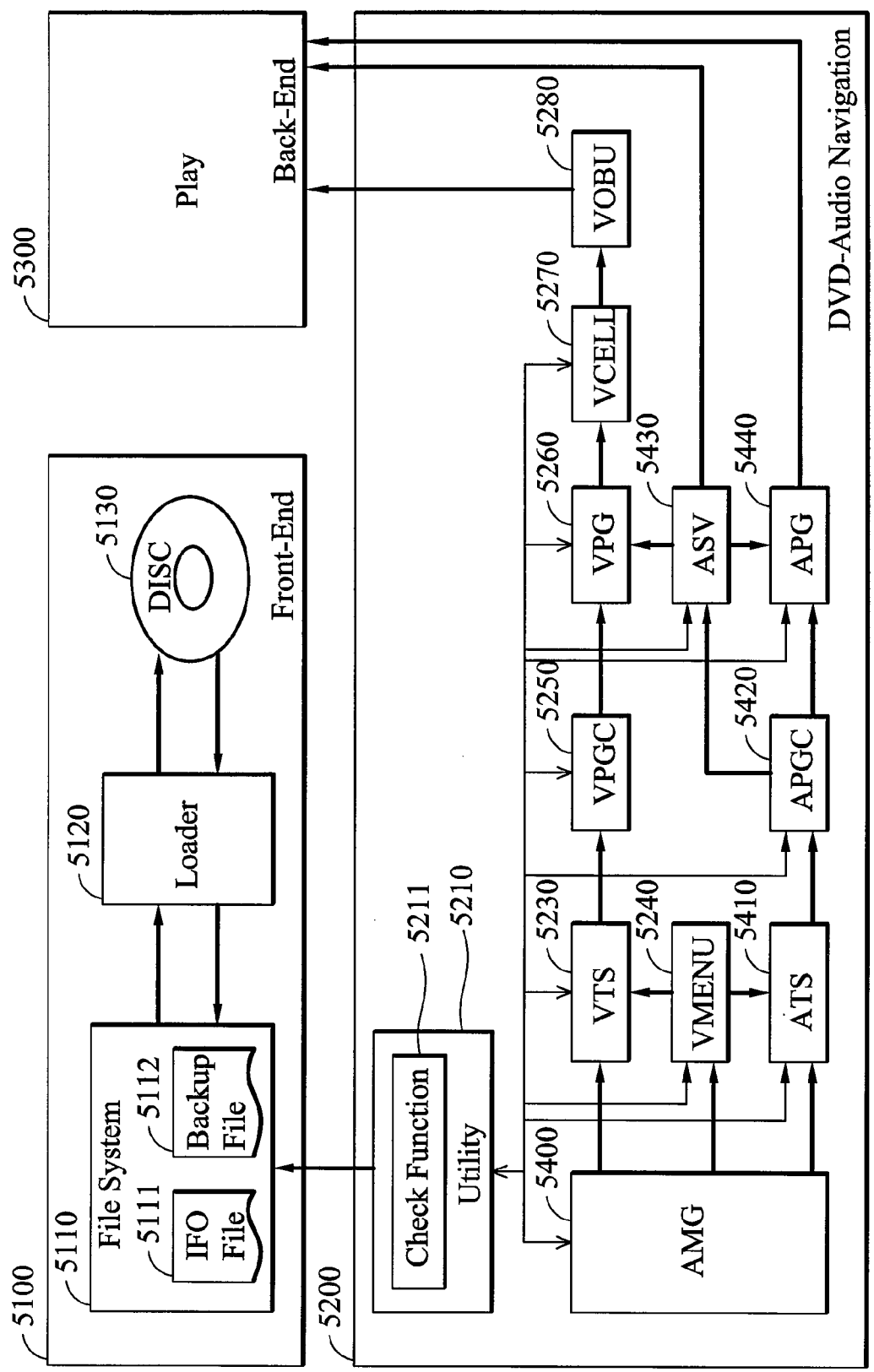
FIG. 6 is a schematic diagram illustrating an embodiment of DVD-Audio navigation.

FIG. 6 is a schematic diagram illustrating an embodiment of DVD-Audio navigation. In addition to the modules as in DVD-Video navigation, AMG module 5400, ATS module 5410, APGC module 5420, APG module 5430, and ASV module 5440 are further provided.

The AMG module 5400 transmits a read table request indicating AMG tables to the utility 5210. The utility 5210 reads the AMG tables from the IFO files 5111 in the file system 5110, and checks the data correctness of the AMG tables by using the check function 5211. If the data is correct, the AMG tables are transmitted to the AMG module 5400 for decoding. If the data is incorrect, the utility 5210 reads the AMG tables from the backup files 5112 of the IFO files 5111 in the file system 5110, and the AMG tables are transmitted to the AMG module 5400 for decoding. The AMG module 5400 decodes the AMG tables to obtain and output related information to the VTS module 5230, the VMENU module 5240, and the ATS module 5410. In this embodiment, the modules operated in DVD-Video navigation are omitted.

The ATS module 5410 receives information from the AMG module 5400, and transmits a read table request indicating ATS tables to the utility 5210 accordingly. The utility 5210 reads the ATS tables from the IFO files 5111 in the file system 5110, and checks the data correctness of the ATS tables by using the check function 5211. If the data is correct, the ATS tables are transmitted to the ATS module 5410 for decoding. If the data is incorrect, the utility 5210 reads the ATS tables from the backup files 5112 in the file system 5110, and then the ATS tables are transmitted to the ATS module 5410 for decoding. The ATS module 5410 decodes the ATS tables to obtain and output related information to the APGC module 5420.

The APGC module 5420 receives information from the ATS module 5410, and transmits a read table request indicating APGC tables to the utility 5210 accordingly. The utility 5210 reads the APGC tables from the IFO files 5111 in the file system 5110, and checks the data correctness of the APGC tables by using the check function 5211. If the data is correct, the APGC tables are transmitted to the APGC module 5250 for decoding. If the data is incorrect, the utility 5210 reads the APGC tables from the backup files 5112 in the file system 5110, and the APGC tables are transmitted to the APGC module 5420 for decoding. The APGC module 5420 decodes the APGC tables to obtain and output related information to the ASV module 5430 and APG module 5440.

The ASV module 5430 receives information from the APGC module 5420, and transmits a read table request indicating ASV tables to the utility 5210 accordingly. The utility 5210 reads the ASV tables from the IFO files 5111 in the file system 5110, and checks the data correctness of the ASV tables by using the check function 5211. If the data is correct, the ASV tables are transmitted to the ASV module 5430 for decoding. If the data is incorrect, the utility 5210 reads the ASV tables from the backup files 5112 in the file system 5110, and the ASV tables are transmitted to the ASV module 5430 for decoding. The ASV module 5430 decodes the ASV tables to obtain and output related information.

The APG module 5440 receives information from the APGC module 5420, and transmits a read table request indicating APG tables to the utility 5210 accordingly. The utility 5210 reads the APG tables from the IFO files 5111 in the file system 5110, and checks the data correctness of the APG tables by using the check function 5211. If the data is correct, the APG tables are transmitted to the APG module 5440 for decoding. If the data is incorrect, the utility 5210 reads the APG tables from the backup files 5112 in the file system 5110, and the APG tables are transmitted to the APG module 5440 for decoding. The APG module 5440 decodes the ASV tables to obtain and output related information.

The information generated by the VOBU module 5280, ASV module 5430, and APG module 5440 is used to request the back-end 5300 to play back.

In some embodiments, the utility 5210 always reads tables from the IFO files 5111 if any read table request is received, and reads tables from the backup files 5112 again if the data of tables in the IFO files 5111 is incorrect. In some embodiments, once the data of tables in the IFO files 5111 is incorrect, the utility 5210 directly reads tables from the backup files 5112 for other read table requests.

Figure 7:
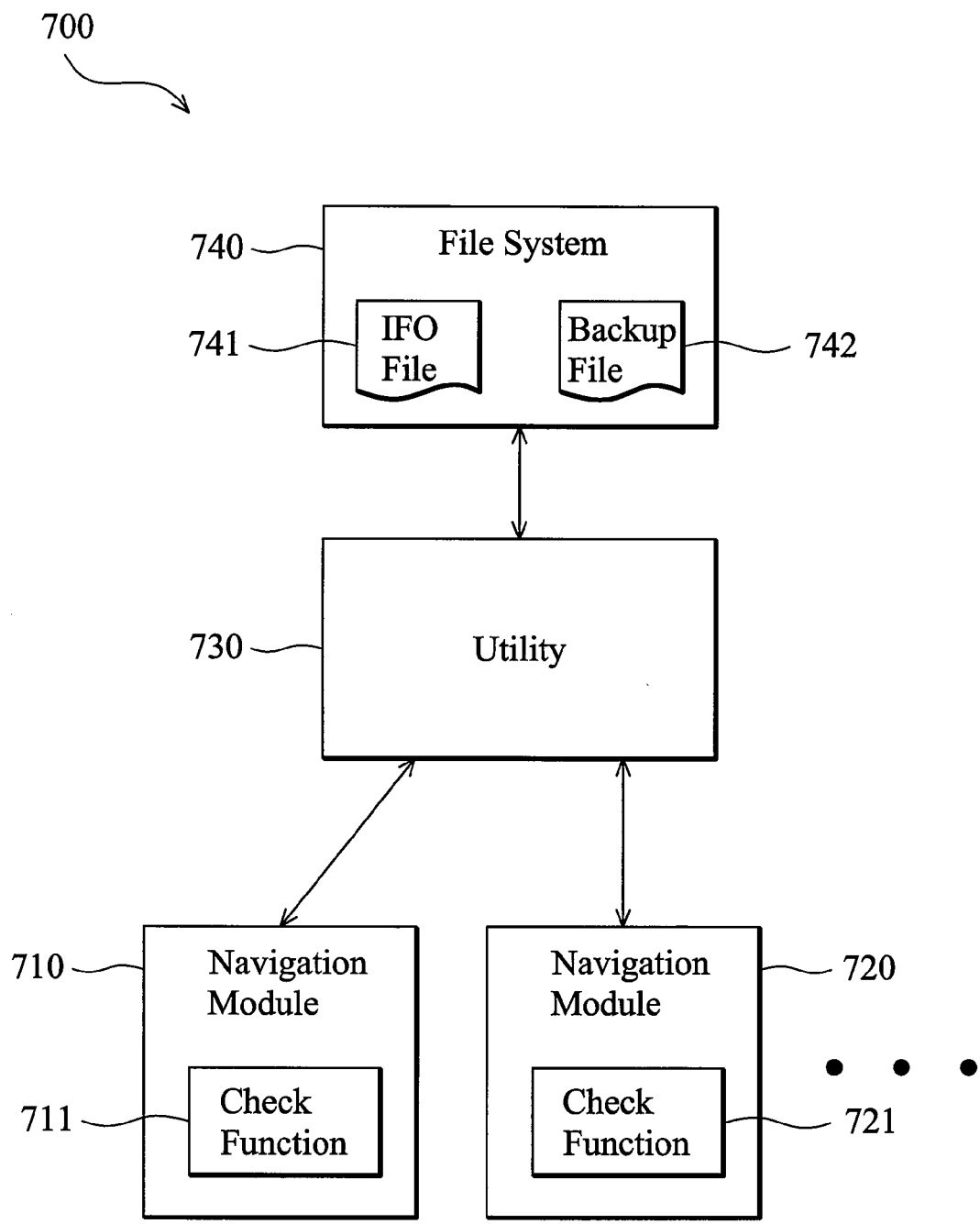
FIG. 7 is a schematic diagram illustrating an embodiment of a DVD navigation system.

FIG. 7 is a schematic diagram illustrating an embodiment of a DVD navigation system.

The DVD navigation system 700 includes a plurality of navigation modules (a first navigation module 710 and a second navigation module 720), a utility 730, and a file system 740. The navigation modules may include modules used in DVD navigation, including VMG, VTS, VMENU, VPGC, VPG, VCELL, AMG, ATS, APGC, APG, and ASV modules. Each navigation module includes a check function determining data correctness of the tables corresponding to the navigation module. For example, the first navigation module 710 includes a first check function 711 determining data correctness of the tables corresponding to the first navigation module 710, and the second navigation module 720 includes a second check function 721 determining data correctness of the tables corresponding to the second navigation module 720. Each navigation module generates and transmits a read table request indicating at least one table required for the navigation module and a function point of the check function to the utility 730.

The utility 730 receives the read table request, and reads related tables from the file system 740. The file system 740 includes at least one IFO file 741, and at least one backup file 742 thereof. The IFO file 741 may be composed of tables, including VMG, VTS, VMENU, VPGC, VPG, VCELL, AMG, ATS, APGC, APG, and ASV tables. At first, the utility 730 reads tables from the IFO file 741 in the file system 740. The utility 730 checks data correctness of the table by calling the check function with parameters including addresses of the received data according to the function point. The check result is transmitted from the check function of the navigation module to the utility 730. If the data is correct, the utility 730 directly transmits the data to the navigation module generating the read table request. If the data is incorrect, the utility 730 reads tables from the backup file 742 of the IFO file 741 in the file system 740, and transmits the data to the navigation module generating the read table request.

Figure 8:
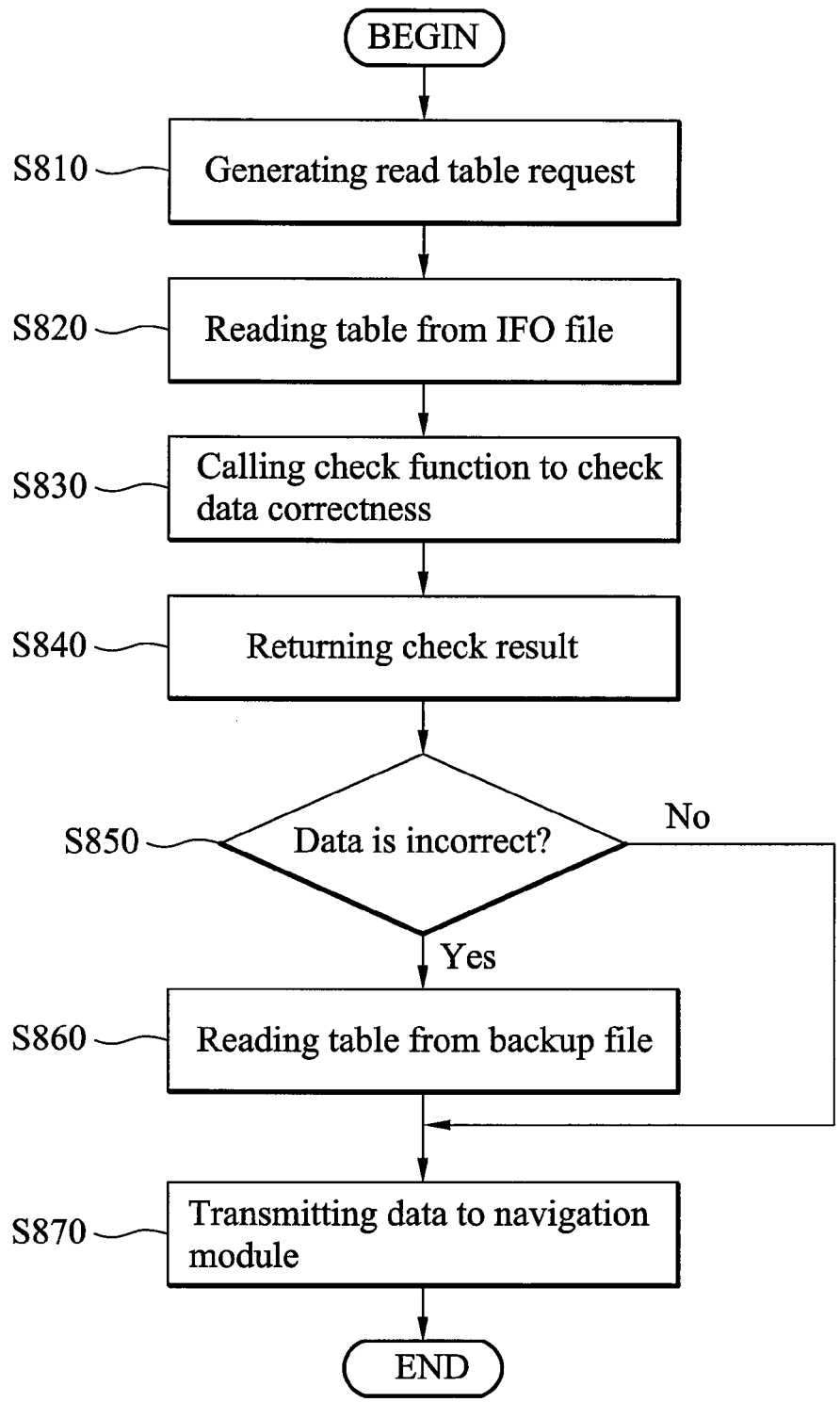
FIG. 8 is a flowchart showing an embodiment of a DVD navigation method.

FIG. 8 is a flowchart showing an embodiment of a DVD navigation method. In step S810, a read table request is generated by a navigation module. In step S820, at least one table indicated by the read table request is read from at least one IFO file in the file system. In step S830, the data correctness of the table is checked by calling the check function in the navigation module with parameters including the address of the received data. In step S840, the check result is returned from the check function. Proceeding to step S850, determine whether the data of the table is correct or not. If the data of the table is correct, proceeding to step S870, the data of the table is directly transmitted to the navigation module according to the read table request. If the data is incorrect, proceeding to step S860, the table indicated by the read table request is read from at least one backup file of the IFO file in the file system again, and then the data of the table is transmitted to the navigation module requesting the table in step S870.

Figure 9:
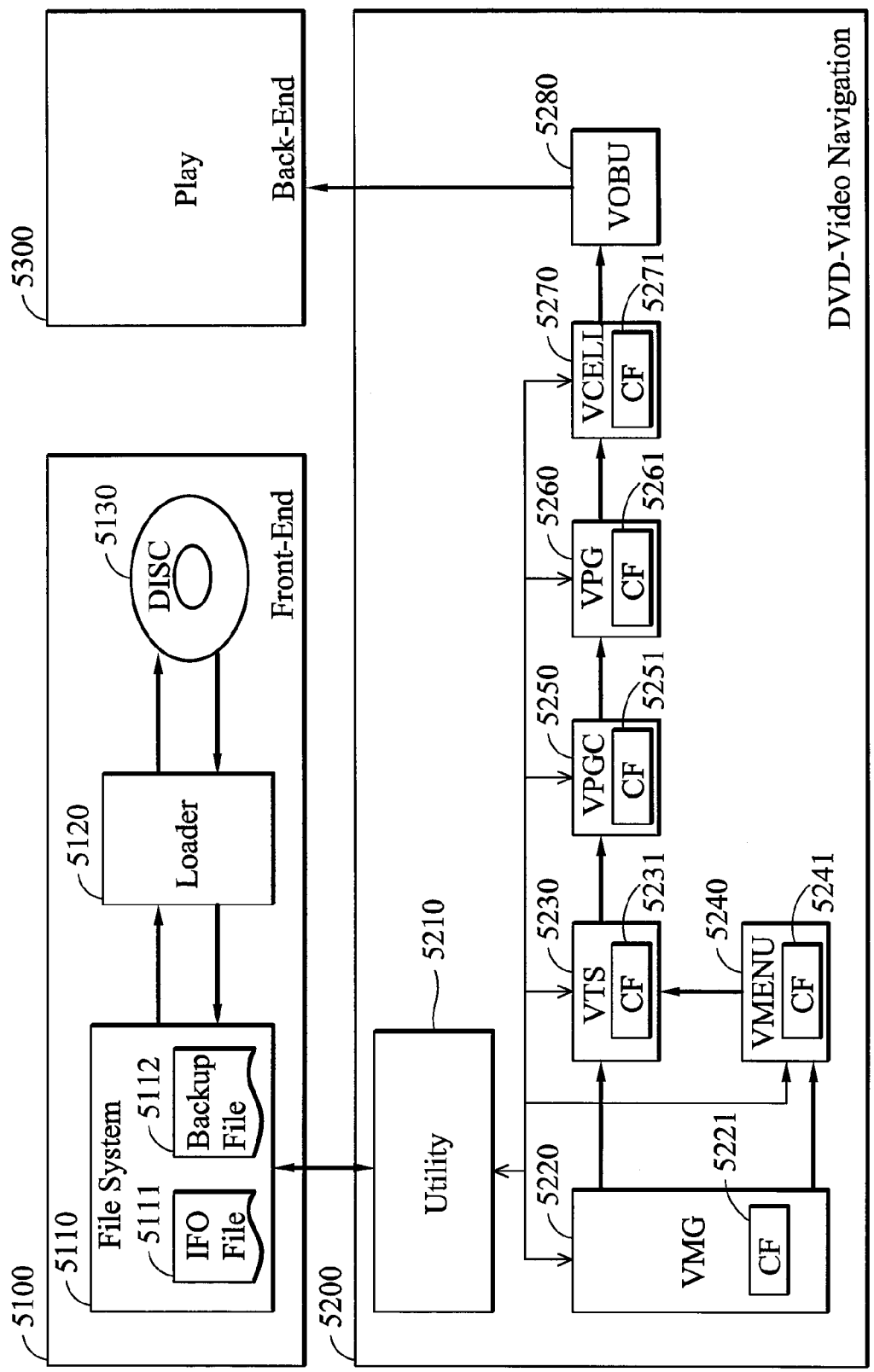
FIG. 9 is a schematic diagram illustrating an embodiment of DVD-Video navigation.

FIG. 9 is a schematic diagram illustrating an embodiment of DVD-Video navigation.

In front-end 5100, a file system 5110 reads and stores data from a disc 5130, such as DVD via a loader 5120, and stores the data therein. The data includes IFO files 5111, backup files 5112 of the IFO files 5111 and VOB files (not shown). Tables in these files include VMG, VTS, VMENU, VPGC, VPG, VCELL, and VOBU tables.

In DVD-Video navigation, VMG module 5220, VTS module 5230, VMENU module 5240, VPGC module 5250, VPG module 5260, VCELL module 5270, and VOBU module 5280 are provided. Each module includes a check function determining the data correctness of table correspondingly, and reads tables via a utility 5210. The VMG module 5220 transmits a read table request indicating VMG tables and a function point of a check function (CF) 5221 to the utility 5210. The utility 5210 reads the VMG tables from the IFO files 5111 in the file system 5110, and checks the data correctness of the VMG tables by calling the check function 5221 according to the function point. If the data is correct, the VMG tables are transmitted to the VMG module 5220 for decoding. If the data is incorrect, the utility 5210 reads the VMG tables from the backup files 5112 of the IFO files 5111 in the file system 5110, and the VMG tables are transmitted to the VMG module 5220 for decoding. The VMG module 5220 decodes the VMG tables to obtain and output related information to the VTS module 5230 or the VMENU module 5240.

The VMENU module 5240 receives information from the VMG module 5220, and transmits a read table request indicating VMENU tables and a function point of a check function (CF) 5241 to the utility 5210 accordingly. The utility 5210 reads the VMENU tables from the IFO files 5111 in the file system 5110, and checks the data correctness of the VMENU tables by calling the check function 5241 according to the function point. If the data is correct, the VMENU tables are transmitted to the VMENU module 5240 for decoding. If the data is incorrect, the utility 5210 reads the VMENU tables from the backup files 5112 in the file system 5110, and the VMENU tables are transmitted to the VMENU module 5240 for decoding. The VMENU module 5240 decodes the VMENU tables to obtain and output related information to the VTS module 5230.

The VTS module 5230 receives information from the VMG module 5220 and the VMENU module 5240, and transmits a read table request indicating VTS tables and a function point of a check function (CF) 5231 to the utility 5210 accordingly. The utility 5210 reads the VTS tables from the IFO files 5111 in the file system 5110, and checks the data correctness of the VTS tables by calling the check function 5231 according to the function point. If the data is correct, the VTS tables are transmitted to the VTS module 5230 for decoding. If the data is incorrect, the utility 5210 reads the VTS tables from the backup files 5112 of the IFO files 5111 in the file system 5110, and the VTS tables are transmitted to the VTS module 5230 for decoding. The VTS module 5230 decodes the VTS tables to obtain and output related information to the VPGC module 5250.

The VPGC module 5250 receives information from the VTS module 5230, and transmits a read table request indicating VPGC tables and a function point of a check function (CF) 5251 to the utility 5210 accordingly. The utility 5210 reads the VPGC tables from the IFO files 5111 in the file system 5110, and checks the data correctness of the VPGC tables by calling the check function 5251 according to the function point. If the data is correct, the VPGC tables are transmitted to the VPGC module 5250 for decoding. If the data is incorrect, the utility 5210 reads the VPGC tables from the backup files 5112 in the file system 5110, and the VPGC tables are transmitted to the VPGC module 5250 for decoding. The VPGC module 5250 decodes the VPGC tables to obtain and output related information to the VPG module 5260.

The VPG module 5260 receives information from the VPGC module 5250, and transmits a read table request indicating VPG tables and a function point of a check function 5261 to the utility 5210 accordingly. The utility 5210 reads the VPG tables from the IFO files 5111 in the file system 5110, and checks the data correctness of the VPG tables by calling the check function 5261 according to the function point. If the data is correct, the VPG tables are transmitted to the VPG module 5260 for decoding. If the data is incorrect, the utility 5210 reads the VPG tables from the backup files 5112 in the file system 5110, and the VPG tables are transmitted to the VPG module 5260 for decoding. The VPG module 5260 decodes the VPG tables to obtain and output related information to the VCELL module 5270.

The VCELL module 5270 receives information from the VPG module 5260, and transmits a read table request indicating VCELL tables and a function point of a check function 5271 to the utility 5210 accordingly. The utility 5210 reads the VCELL tables from the IFO files 5111 in the file system 5110, and checks the data correctness of the VCELL tables by calling the check function 5271 according to the function point. If the data is correct, the VCELL tables are transmitted to the VCELL module 5270 for decoding. If the data is incorrect, the utility 5210 reads the VCELL tables from the backup files 5112 in the file system 5110, and the VCELL tables are transmitted to the VCELL module 5270 for decoding. The VCELL module 5270 decodes the VCELL tables to obtain and output related information to the VOBU module 5280.

The VOBU module 5280 receives information from the VCELL module 5270, finds the address and length of VOBUs needed for playback, and requests the back-end 5300 to play back.

Figure 10:
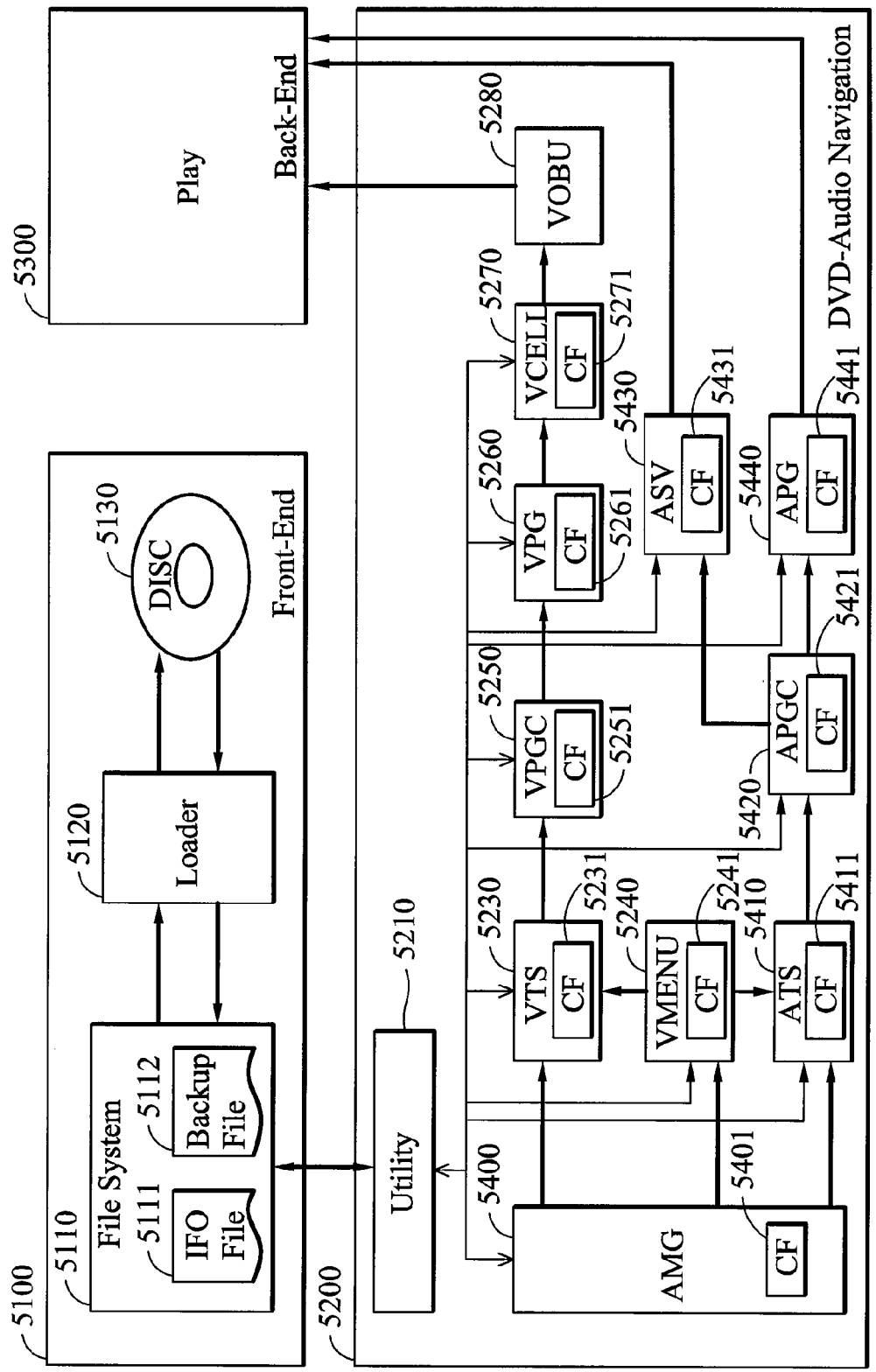
FIG. 10 is a schematic diagram illustrating an embodiment of DVD-Audio navigation.

FIG. 10 is a schematic diagram illustrating an embodiment of DVD-Audio navigation. In addition to the modules as in DVD-Video navigation, AMG module 5400, ATS module 5410, APGC module 5420, APG module 5430, and ASV module 5440 are further provided.

The AMG module 5400 transmits a read table request indicating AMG tables and a function point of a check function 5401 to the utility 5210. The utility 5210 reads the AMG tables from the IFO files 5111 in the file system 5110, and checks the data correctness of the AMG tables by calling the check function 5401 according to the function point. If the data is correct, the AMG tables are transmitted to the AMG module 5400 for decoding. If the data is incorrect, the utility 5210 reads the AMG tables from the backup files 5112 in the file system 5110, and the AMG tables are transmitted to the AMG module 5400 for decoding. The AMG module 5400 decodes the AMG tables to obtain and output related information to the VTS module 5230, the VMENU module 5240, and the ATS module 5410. Operation of the modules in DVD-video navigation is omitted here.

The ATS module 5410 receives information from the AMG module 5400, and transmits a read table request indicating ATS tables and a function point of a check function 5411 to the utility 5210 accordingly. The utility 5210 reads the ATS tables from the IFO files 5111 in the file system 5110, and checks the data correctness of the ATS tables by calling the check function 5411 according to the function point. If the data is correct, the ATS tables are transmitted to the ATS module 5410 for decoding. If the data is incorrect, the utility 5210 reads the ATS tables from the backup files 5112 in the file system 5110, and the ATS tables are transmitted to the ATS module 5410 for decoding. The ATS module 5410 decodes the ATS tables to obtain and output related information to the APGC module 5420.

The APGC module 5420 receives information from the ATS module 5410, and transmits a read table request indicating APGC tables and a function point of a check function 5421 to the utility 5210 accordingly. The utility 5210 reads the APGC tables from the IFO files 5111 in the file system 5110, and checks the data correctness of the APGC tables by calling the check function 5421 according to the function point. If the data is correct, the APGC tables are transmitted to the APGC module 5250 for decoding. If the data is incorrect, the utility 5210 reads the APGC tables from the backup files 5112 in the file system 5110, and the APGC tables are transmitted to the APGC module 5420 for decoding. The APGC module 5420 decodes the APGC tables to obtain and output related information to the ASV module 5430 and APG module 5440.

The ASV module 5430 receives information from the APGC module 5420, and transmits a read table request indicating ASV tables and a function point of a check function 5431 to the utility 5210 accordingly. The utility 5210 reads the ASV tables from the IFO files 5111 in the file system 5110, and checks the data correctness of the ASV tables by calling the check function 5431 according to the function point. If the data is correct, the ASV tables are transmitted to the ASV module 5430 for decoding. If the data is incorrect, the utility 5210 reads the ASV tables from the backup files 5112 in the file system 5110, and the ASV tables are transmitted to the ASV module 5430 for decoding. The ASV module 5430 decodes the ASV tables to obtain and output related information.

The APG module 5440 receives information from the APGC module 5420, and transmits a read table request indicating APG tables and a function point of a check function 5441 to the utility 5210 accordingly. The utility 5210 reads the APG tables from the IFO files 5111 in the file system 5110, and checks the data correctness of the APG tables by calling the check function 5441 according to the function point. If the data is correct, the APG tables are transmitted to the APG module 5440 for decoding. If the data is incorrect, the utility 5210 reads the APG tables from the backup files 5112 in the file system 5110, and the APG tables are transmitted to the APG module 5440 for decoding. The APG module 5440 decodes the ASV tables to obtain and output related information.

The information generated by the VOBU module 5280, ASV module 5430, and APG module 5440 is used to request the back-end 5300 to play back.

Therefore, the present invention provides solutions for DVD navigation with dynamically using BUP and IFO files, ensuring normally playback when any IFO file is lost or damaged. Additionally, since check functions can be designed in the utility or in respective navigation modules in the present invention, the design and maintenance thereof can be more flexible and easy.

DVD navigation systems and methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission. When the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A DVD navigation system, comprising:
a front-end comprising a file system reading and storing data from a disc via a loader, wherein the data includes IFO files and backup files;
a plurality of navigation modules, each comprising a check function determining data correctness of tables corresponding to the respective navigation modules, and generating a read table request; and
a utility receiving the read table request, reading at least one table identified by the read table request from at least one IFO file in the file system, checking data correctness of the table indicated by the read table request by using the check function, reading the table indicated by the read table request from at least one backup file of the IFO file in the file system if the data of the table indicated by the read table request is incorrect, wherein the table read from the at least one backup file has the same file format as a file format of the table indicated by the read table request, wherein the table indicated by the read table request is a portion of the IFO file, reading the table indicated by the read table request from the IFO file in the file system if the data of the table indicated by the read table request is correct, and transmitting the data to each corresponding navigation module requesting the table according to the read table request for decoding;
wherein the utility checks data correctness of the table by determining whether the quantity of the at least one table equals the total size of the at least one table divided by the table size, in which the total size of the at least one table is recorded in a specific table containing the table.

2. A computer-implemented DVD navigation method for use in a plurality of navigation modules, each comprising a check function determining data correctness of tables corresponding to the respective navigation modules, comprising:
providing a front-end comprising a file system reading and storing data from a disc via a loader, wherein the data includes IFO files and backup files;
generating a read table request by each navigation module;
reading, by a utility, at least one table identified by the read table request from at least one IFO file in the file system;
checking data correctness of the table indicated by the read table request by the utility using the check function, by determining whether the quantity of the at least one table equals the total size of the at least one table divided by the table size, in which the total size of the at least one table is recorded in a specific table containing the table;
reading, by the utility, the table indicated by the read table request from at least one backup file of the IFO file in the file system if the data of the table indicated by the read table request is incorrect, wherein the table read from the at least one backup file has the same file format as a file format of the table indicated by the read table request, wherein the table indicated by the read table request is a portion of the IFO file, and reading the table indicated by the read table request from the IFO file in the file system if the data of the table indicated by the read table request is correct; and transmitting the data to each corresponding navigation module requesting the table according to the read table request for decoding.

3. A DVD navigation system, comprising:

a front-end comprising a file system reading and storing data from a disc via a loader, wherein the data includes IFO files and backup files;

a plurality of navigation modules, each navigation module generating a read table request;

a utility comprising at least one check function, reading at least one table identified by the read table request from at least one IFO file in the file system, checking data correctness of the table indicated by the read table request by using the check function, reading the table indicated by the read table request from at least one backup file of the IFO file in the file system if the data of the table indicated by the read table request is incorrect, wherein the table read from the at least one backup file has the same file format as a file format of the table indicated by the read table request, wherein the table indicated by the read table request is a portion of the IFO file, reading the table indicated by the read table request from the IFO file in the file system if the data of the table indicated by the read table request is correct, and transmitting the data to each corresponding navigation module requesting the table according to the read table request for decoding;

wherein the utility checks data correctness of the table by determining whether the quantity of the at least one table equals the total size of the at least one table divided by the table size, in which the total size of the at least one table is recorded in a specific table containing the table.

4. A computer-implemented DVD navigation method for use in a plurality of navigation modules and a utility comprising at least one check function, comprising:

providing a front-end comprising a file system reading and storing data from a disc via a loader, wherein the data includes IFO files and backup files;

each navigation module generating a read table request;

the utility receiving the read table request, and reading at least one table identified by the read table request from at least one IFO file in the file system;

the utility checking data correctness of the table indicated by the read table request using the check function by determining whether the quantity of the at least one table equals the total size of the at least one table divided by the table size, in which the total size of the at least one table is recorded in a specific table containing the table;

the utility reading the table indicated by the read table request from at least one backup file of the IFO file in the file system if the data of the table indicated by the read table request is incorrect, wherein the table read from the at least one backup file has the same file format as a file format of the table indicated by the read table request, wherein the table indicated by the read table request is a portion of the IFO file, and reading the table indicated by the read table request from the IFO file in the file system if the data of the table indicated by the read table request is correct; and transmitting the data to each corresponding navigation module requesting the table according to the read table request for decoding.

* * * * *